(12) United States Patent
Ford

(10) Patent No.: US 6,181,364 B1
(45) Date of Patent: *Jan. 30, 2001

(54) SYSTEM FOR FILTERING CONTENT FROM VIDEOS

(75) Inventor: K. Harlan Ford, Tulsa, OK (US)

(73) Assignee: United Video Properties, Inc., Tulsa, OK (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/857,977

(22) Filed: May 16, 1997

(51) Int. Cl.⁷ ................................................ H04N 7/16
(52) U.S. Cl. .......................... 348/5.5; 348/460; 348/632
(58) Field of Search .......................... 348/5.5, 460, 632; 380/10, 20; 395/188.01; 704/275

(56) References Cited

U.S. PATENT DOCUMENTS

| | | | |
|---|---|---|---|
| 4,520,404 | 5/1985 | Von Kohorn | 358/335 |
| 4,554,584 | 11/1985 | Elam et al. | 358/165 |
| 4,605,964 | 8/1986 | Chard | 358/147 |
| 4,605,973 | 8/1986 | Von Kohorn | 358/335 |
| 4,620,229 | 10/1986 | Amano et al. | 358/194.1 |
| 4,685,131 | 8/1987 | Horne | 380/20 |
| 4,718,107 | 1/1988 | Hayes | 455/4 |
| 4,750,213 | 6/1988 | Novak | 455/67 |
| 4,888,796 | 12/1989 | Olivo, Jr. | 379/101 |
| 4,930,158 | 5/1990 | Vogel | 380/5 |
| 4,930,160 | 5/1990 | Vogel | 380/23 |
| 5,056,139 | 10/1991 | Littlefield | 380/20 |
| 5,172,111 | 12/1992 | Olivo, Jr. | 340/825.31 |
| 5,195,135 * | 3/1993 | Palmer | 348/5.5 |
| 5,253,066 | 10/1993 | Vogel | 358/188 |
| 5,369,440 * | 11/1994 | Sussman | 348/462 |
| 5,371,795 | 12/1994 | Vogel | 380/23 |
| 5,387,942 | 2/1995 | Lemelson | 348/474 |
| 5,434,678 | 7/1995 | Abecassis | 358/342 |
| 5,446,488 | 8/1995 | Vogel | 348/3 |
| 5,488,410 * | 1/1996 | Lieberfarb et al. | 348/5.5 |
| 5,550,575 | 8/1996 | West et al. | 348/5.5 |
| 5,552,837 | 9/1996 | Mankovitz | 348/734 |
| 5,583,576 | 12/1996 | Perlman et al. | 348/460 |
| 5,757,417 * | 5/1998 | Aras et al. | 348/1 |
| 5,758,258 * | 5/1998 | Shoff et al. | 348/5.5 |
| 5,828,402 | 10/1998 | Collings | 348/5.5 |
| 5,832,212 * | 11/1998 | Cragun et al. | 395/188.01 |
| 5,870,708 * | 2/1999 | Stewart | 704/275 |

FOREIGN PATENT DOCUMENTS

| | | | |
|---|---|---|---|
| 2 678 091 | 12/1992 | (FR) | G06K/17/00 |
| 59-210782 | 11/1984 | (JP) | H04N/7/16 |
| WO 83/02208 A1 | 6/1983 | (WO) | H04N/7/04 |

OTHER PUBLICATIONS

"PICS: Internet Access Controls Without Censorship," by Paul Resnick and James Miller, pp. 1–7.

* cited by examiner

*Primary Examiner*—Victor R. Kostak
(74) *Attorney, Agent, or Firm*—Fish & Neave; G. Victor Treyz; Pejman Sharifi

(57) ABSTRACT

A system is provided for filtering out potentially objectionable content from a video. The system is preferably implemented with user equipment such as a set-top box, a dedicated stand-alone box, a videocassette recorder, or circuitry in other television equipment. Videos to be filtered have embedded information that identifies potentially objectionable substitution events. The system determines which substitution events are to be filtered out based on selectable ratings settings. If desired, filtered video images may be replaced with blank video images and filtered audio signals may by replaced with silence or a tone. Filtering may also be accomplished by disrupting the event to be filtered (e.g., by garbling the event). Filtering may involve making substitutions of audio or video information. For example, audio information in a substitution event may be replaced by appropriate audio segments. Video information in a substitution event may be replaced by a video still or by a video clip.

24 Claims, 6 Drawing Sheets

26

| SUBSTITUTION EVENT CODE | SUBSTITUTION ATTRIBUTE |
|---|---|
| 2730 | TONE |
| 1021 | SUBSTITUTE WORD NO. 272 |
| 0212 | NO AUDIO |
| 6462 | BLANK VIDEO |
| 1392 | SUBSTITUTE IMAGE NO. 10 |
| ⋮ | ⋮ |

*FIG. 2*

SYSTEM FOR FILTERING CONTENT FROM VIDEOS

BACKGROUND OF THE INVENTION

This invention relates to video systems, and more particularly, to filtering out certain events from videos in real time.

Television viewing is a common leisure time activity. Families gather nightly to watch their favorite programs. Pay-per-view movies and videocassette rentals are also popular sources of videos for family viewing.

A concern of many parents is that their children are exposed to too much sexually related and violent material. Although many television programs and movies are rated by industry associations, such ratings are of limited usefulness. Many potentially objectionable events occur in a given program or movie and the objectionable nature of the events varies from event to event. Nevertheless, at most a single rating is provided for each program or movie. As a result, some programs and movies may be given less mature ratings than they deserve, because the sexual or violent content of a relatively small number of events may be overlooked by a ratings association. Other programs and movies may be given more mature ratings than they deserve.

This situation presents parents with a dilemma. If a parent limits a child's viewing to only those works with age-appropriate ratings, the child may feel that the parent is being overly restrictive. If the parent allows the child to view works with more mature ratings, the child will probably be exposed to at least some content that the parent feels is inappropriate for their child.

Adults without children who are disturbed by the amount of sexually related and violent material that they are exposed to are faced with a similar problem. They can either forego viewing certain programs and movies based on subjective and potentially inaccurate ratings information or can be forced to tolerate objectionable events in the programs and movies that they view.

One proposal that addresses concerns about sex and violence on television is to use blocking circuitry (sometimes referred to as the V-chip) to selectively block televised programs based on ratings information. Televisions with such blocking circuitry could be configured to only display television programs with certain ratings. However, this type of system would still be subject to the problems associated with ratings systems that apply a single rating to each television program or movie. Blocking all television programs with mature ratings may be overly restrictive. Allowing programs with mature ratings to be displayed will expose viewers to potentially objectionable material.

It is therefore an object of the present invention to provide a way in which to selectively filter out potentially objectionable events from television programs and videos.

SUMMARY OF THE INVENTION

This and other objects of the invention are accomplished in accordance with the principles of the present invention by providing a filtering system in which certain potentially objectionable events in a video may be filtered out prior to displaying the video on the user's home video equipment. Such potentially objection events (called substitution events) may be scenes in a television program or movie with profane or vulgar language or of a sexual or violent nature. The filtering system is preferably implemented with user equipment such as a set-top box, a stand-alone setup, a personal computer television (PC/TV), circuitry in a videocassette recorder or television, etc. Substitution events may therefore be filtered out locally, under the direction of the user.

The user can select which types of potentially objectionable events are to be filtered out by interactively selecting from among predefined ratings settings in real time. If desired, the user can customize an existing ratings setting or create a list of objectionable events. Customized ratings settings and user-created lists of objectionable events are preferably stored as user-defined ratings settings, which are preferably among the predefined ratings settings that the user can interactively select.

Videos suitable for filtering are provided with substitution event information that identifies potentially objectionable events in the video. For example, substitution event codes may be embedded in a video (e.g., in the vertical blanking interval portion of a video signal or in a side band) to identify each portion of the video that contains profane, vulgar, sexually related, violent, or otherwise objectionable content. During operation, the system extracts the embedded substitution event codes and compares the extracted codes to a predefined list of prohibited substitution event codes contained in a substitution event table. If a given substitution event code is contained in the substitution event table, the substitution event corresponding to that code is filtered out by the system.

Filtering may be accomplished by blocking an audio or video signal for the duration of the undesired substitution event or may involve disrupting the event (e.g., by distorting, attenuating, overlaying, garbling or otherwise disrupting the audio and video signals for the event). Filtering may also be accomplished by substituting audio or video material for the substitution event. The type of substitution that is to be performed for a given substitution event can be defined as a function of substitution attributes contained in the substitution event table and locally selectable configuration parameters. When the system extracts a substitution event code from the unfiltered video and that substitution event code corresponds to a substitution event code in the substitution event table, the corresponding substitution attribute entry in the table can be used to define what type of substitution is made.

Audio substitutions may be stored in a library of audio clips. Audio substitutions may also be made by synthesizing audio signals in real time. Video image substitutions may be stored in a video library of video stills or video clips. The actors who performed an original work may prerecord material to be used during a substitution. For example, an actor may record an alternate version of a potentially objectionable passage. The alternate version of the passage can be stored in a library for use during substitutions.

Further features of the invention, its nature and various advantages will be more apparent from the accompanying drawings and the following detailed description of the preferred embodiments.

BRIEF DESCRIPTION OF THE DRAWINGS

FIG. 2 is an illustrative substitution event table in accordance with the present invention.

DETAILED DESCRIPTION OF THE PREFERRED EMBODIMENTS

Figure 1:
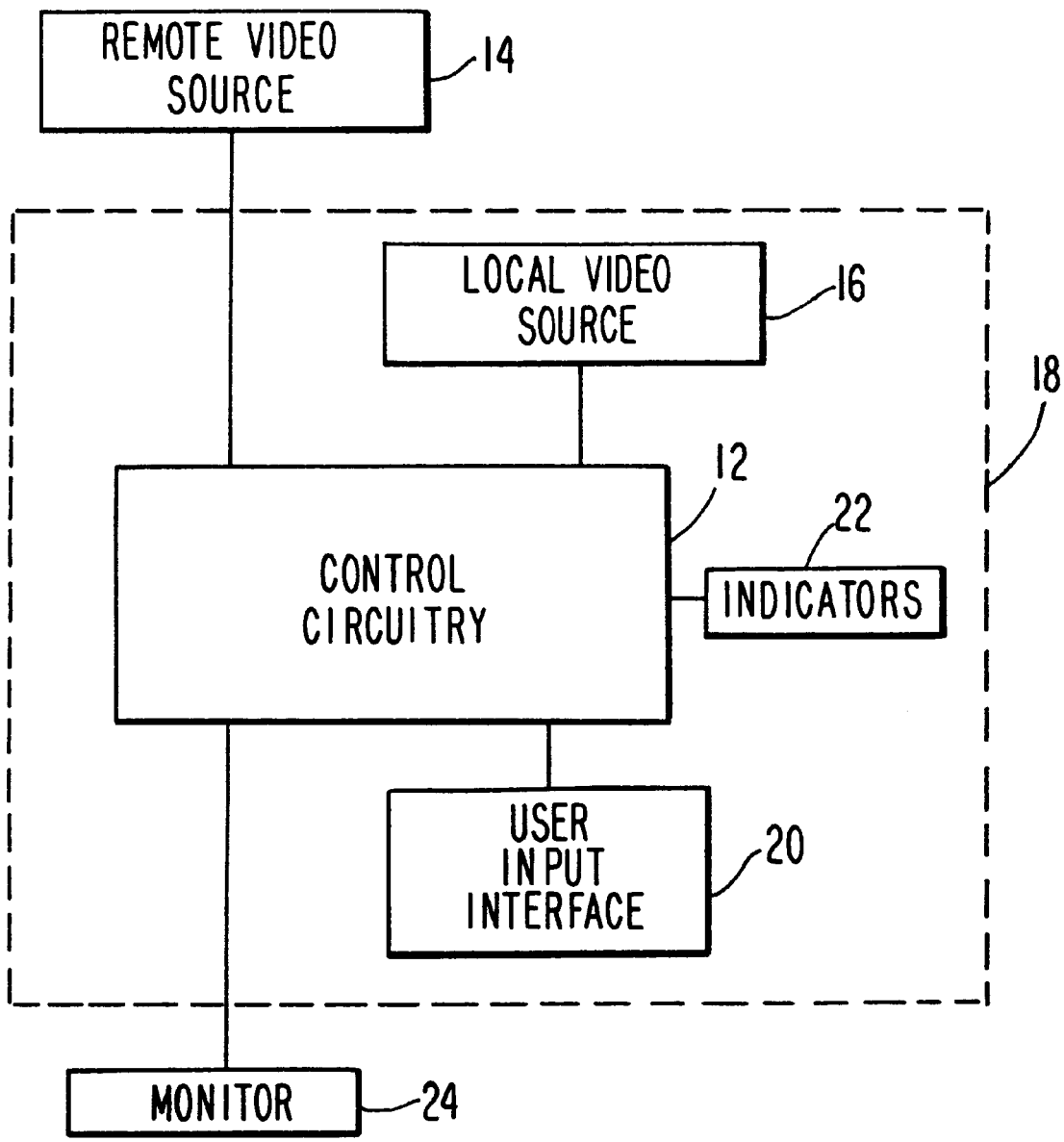
FIG. 1 is a schematic block diagram of a system in accordance with the present invention.

An illustrative system 10 in accordance with the present invention is shown in FIG. 1. System 10 filters videos so that objectionable content is not displayed to the viewer. In system 10 unfiltered video signals are provided to control circuitry 12 by remote video source 14 and by local video source 16. Remote video source 14 may be any suitable source of video programming that is remote from user equipment 18. For example, remote video source 14 may be a cable television source connected to control circuitry 12 by coaxial or fiber optic cable. Remote video source 14 may also be a satellite or broadcast television source that transmits television programs to control circuitry 12 through free space. If desired, a file server or other suitable video source may be used to distribute video to control circuitry 12 over a network. Local video source 16, which is preferably part of user equipment 18, may be a videocassette recorder, a laser disk player, a digital video disk (DVD) player, or any other suitable device for playing video media.

The video content from remote video source 14 is typically in the form of television programs or movies. The video content from local video source 16 is typically in the form of movies (e.g., from rented videocassettes). As defined herein, video works in any form (television programs, movies, music videos, instructional videos, etc.) from remote video source 14 or local video source 16 are referred to as videos. Such videos include associated audio information.

User equipment 18 may be based on a set-top box and may contain software to implement certain features of the invention. User equipment 18 may also be implemented using stand-alone equipment or using a personal computer television (PC/TV). If desired, user equipment 18 may be integrated into a videocassette recorder or television.

Regardless of the particular hardware implementation of user equipment 18, a user can input information for controlling user equipment 18 via user input interface 20. Suitable user input interfaces include wireless remote controls, pointing devices such as mouses or trackballs, voice recognition systems, touch screens, buttons, etc. Indicators 22 are used to provide visible indications of the state of user equipment 18 to the user. Suitable indicators 22 include light emitting diodes, lamps, liquid crystal displays, etc. If desired, the indicator functions of indicators 22 may be provided by using control circuitry 12 to generate on-screen indicator images.

User equipment 18 filters the incoming videos from remote video source 14 and local video source 16 and generates corresponding filtered videos that are provided to monitor 24. Monitor 24 may be a standard television or a dedicated display device with audio capabilities. Audio functions may also be performed by a separate audio setup (not shown).

Videos from remote video source 14 and local video source 16 contain embedded codes (called substitution event codes) that identify the location and nature of potentially objectionable events (called substitution events). For example, substitution events containing profane or vulgar language or language relating to sex or violence or other objectionable content can be identified and classified according to the words or type of words that are used. Similarly, sexually explicit, violent, or other objectionable visual substitution events can be identified and classified. A substitution code for a substitution event may be embedded in a video for the duration of the substitution event. Alternatively, the substitution code may be embedded in the video at the start of the substitution event with an embedded duration code specifying the length of the substitution event.

Control circuitry 12 preferably contains memory in which a substitution event table is stored. The substitution event table contains a list of substitution event codes corresponding to selected substitution events (i.e., events a user has decided are to be filtered out from the videos provided to control circuitry 12). Videos may be filtered by substituting default video and audio signals in place of substitution events. For example, audio substitution events may be replaced by silence or by a tone. Video substitution events may be replaced by a blank video image or a graphic overlay.

In some (e.g., low-end) embodiments of the invention, there are relatively few alternative actions that may be taken when a substitution event is detected. For example, the only available option when a substitution event is detected may be to blank and mute the screen. In such systems, the substitution event table is essentially just a list of events to be filtered. The default action (to blank and mute) is stored as a configuration parameter in control circuitry 12.

In other (e.g., high-end) embodiments of the invention, each substitution event code in the substitution event table has a corresponding entry called a substitution attribute, which specifies a more complex type of action to be taken when a substitution event is detected. In this type of configuration, the substitution event table performs a mapping function by specifying what type of substitution should be performed for each particular detected substitution event. The information used to build substitution event tables may be prestored in circuitry 12, may be obtained from a file or an embedded signal in the video, or may use a combination of these techniques.

An illustrative substitution event table 26 is shown in FIG. 2. Using the entries in table 26, for example, whenever a substitution event code of 2730 is detected in a video, control circuitry 12 of FIG. 1 substitutes a tone for the substitution event. Whenever a substitution event code of 1021 is detected, control circuitry 12 substitutes word number 272 for the substitution event. Substitute words such as word number 272 may be retrieved from a library or may be synthesized in real time. Whenever a substitution event code of 0212 is detected in a video, silence is substituted for the substitution event. Whenever substitution event code 6462 is detected, a blank video image is substituted for the substitution event. Whenever substitution event code 1392 is detected, substitution image number 10 is substituted for the substitution event. Substitution images such as image number 10 may be still video images or video clips.

The substitution attributes shown in substitution event table 26 are illustrative only. Other suitable substitution event attributes that may be used include substitution event attributes that specify the vocal characteristics of word substitutions and the geometry of video substitutions (e.g., screen coordinates, full screen, half screen, etc.). The audio and video information to be substituted during a substitution event may be stored in memory in control circuitry 12 (FIG.

1). For example, audio samples or other suitable representations of words may be stored. These stored words can be used when it is necessary to replace words in an audio substitution event. Video samples or other suitable representations of video images (still or moving) may be stored. When it is necessary to replace visual images during a substitution event, the stored video image may be used.

A user typically interactively selects a desired substitution event table from several available predefined substitution event tables. Predefined substitution event tables can be assigned ratings settings similar to the those used in standard ratings schemes. For example, a substitution event table that filters out all identifiable sexually related, violent, profane, vulgar, and otherwise objectionable content may be equated with a "G+" ratings setting. A substitution event table that filters out slightly less objectionable content may be equated with a "G" ratings setting. The ratings setting "PG+" may be used to refer to a substitution event table that filters out less objectionable content than the "G" substitution event table and the ratings setting "PG" may be used to refer to a substitution event table that filters out less than the "PG+" table. A rating setting of "NO RATING" is also possible. The substitution event table for the "NO RATING" setting is empty.

An advantage of the present invention is that the user may interactively select different ratings settings in real time when, for example, a child enters or leaves the room where the video is being viewed.

Figure 3:
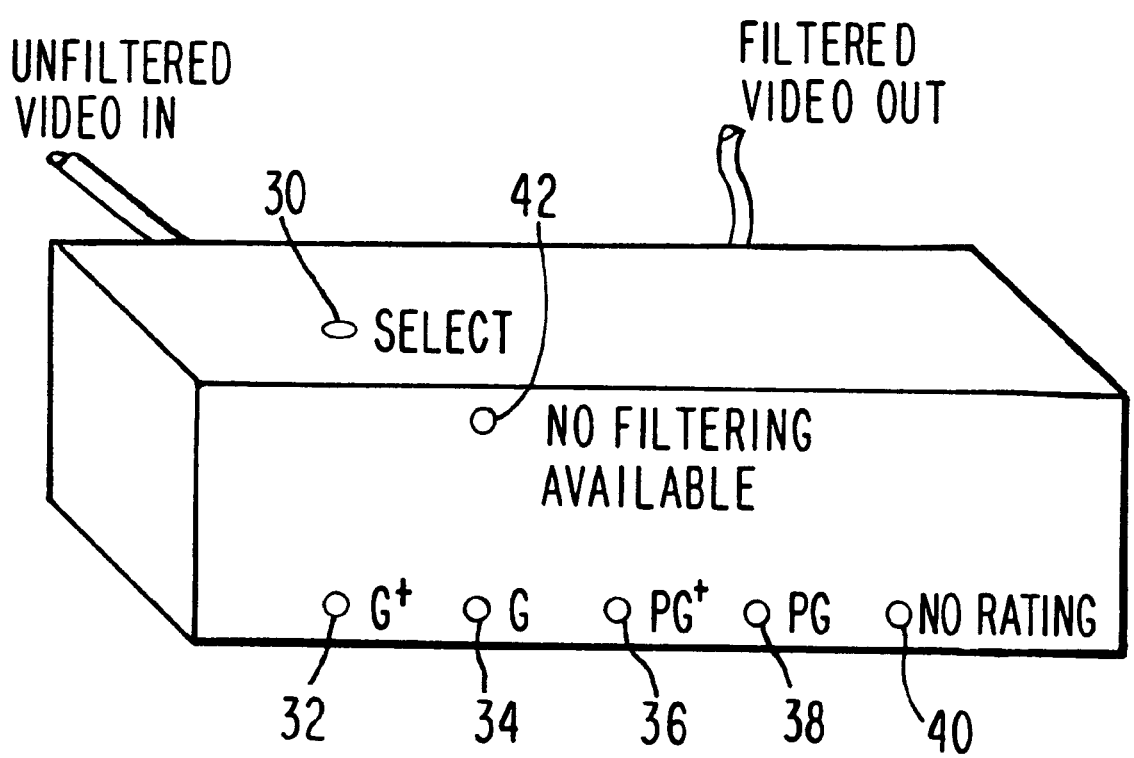
FIG. 3 is a perspective view of an illustrative stand-alone component for filtering content in accordance with the present invention.

A stand-alone system 28 for filtering out substitution events based on a selected ratings setting is shown in FIG. 3. A user may toggle between various ratings settings by depressing select button 30. When the G+ ratings setting is selected, indicator 32 is illuminated. Similarly, when the G, PG+, or PG ratings settings are selected, respective indicators 34, 36, and 38 are illuminated. Indicator 40 is illuminated when the ratings setting "NO RATING" is selected. When the ratings setting "NO RATING" is used, the video through system 28 is not filtered. "NO FILTERING AVAILABLE" indicator 42 is illuminated when system 28 fails to detect embedded substitution codes in incoming video.

Figure 4:
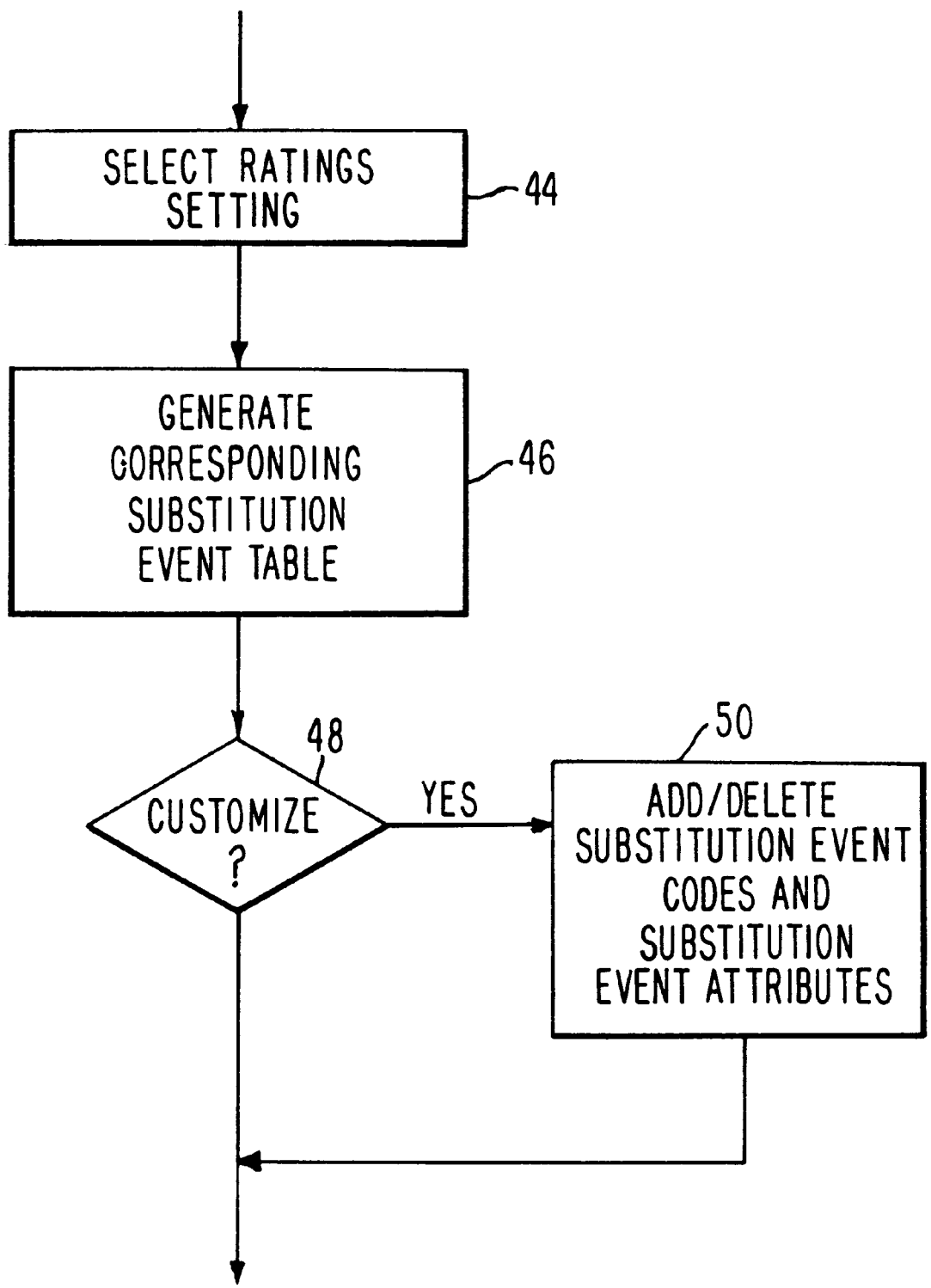
FIG. 4 is a flow chart of steps involved in the process of building a substitution event table in accordance with the present invention.

Steps involved in setting up a substitution event table are shown in FIG. 4. At step 44, the user may select between various ratings settings using user input interface 20 (FIG. 1). Ratings settings selection step 44 may be performed interactively by the user in real time. Control circuitry 12 (FIG. 1) generates a corresponding substitution event table at step 46 (e.g., by locating a predefined substitution event table in memory within control circuitry 12 or other suitable technique). At test 48, it is determined whether or not the user is to customize the substitution event table. If the user indicates that customization is desired, the user adds and/or deletes substitution event codes and substitution event attributes from the substitution event table. The user can save the customized substitution event table for future use.

In order for videos to be filtered, videos must include substitution event codes to identify substitution events. Various coding schemes can be used, ranging from highly specific coding schemes to very general coding schemes. With specific (or explicit) coding, an attempt is made to code as many identifiable profane, vulgar, sexually related, violent or otherwise objectionable words and visual situations. Such specific coding enhances the objectivity of the filtering process. However, implementing a highly specific coding scheme requires handling large amounts of data. Accordingly, it may be desirable to use a more general coding scheme. Although general coding schemes result in more subjectivity, general coding schemes uses less information and are therefore less burdensome to implement than highly-specific coding schemes. If desired, various combinations of specific codes and general codes may be used.

A first illustrative coding scheme uses general video codes and specific audio coding. Approximately five general video substitution event codes may be used to characterize video substitution events. Although such a general video coding scheme is somewhat subjective, the user may change the ratings setting for the filter process interactively in real time as desired. Approximately 500 specific audio substitution events codes may be used to characterize audio substitution events.

A second illustrative coding scheme may use approximately 100 video codes and approximately 500 specific audio codes. This coding scheme uses a hierarchial set of codes for different categories and levels of content. Coding is similar to the Platform for Internet Content Selection (PICS) system that is used for classifying Web pages in the Internet context.

A third illustrative coding scheme uses both specific video coding and specific audio coding. This coding scheme may use approximately 1000 specific video codes and approximately 500 specific audio codes. Specific video codes may be based, for example, on which part of the human body is unclothed or the degree of trauma involved in a violent event.

To code the objectionable language in a video, an encoding technician can refer to the script of the video. If desired, scripts can be electronically processed to facilitate the encoding process. Visual content can be coded by watching the video and identifying which events involve sexually related, violent, or otherwise objectionable events.

Figure 5:
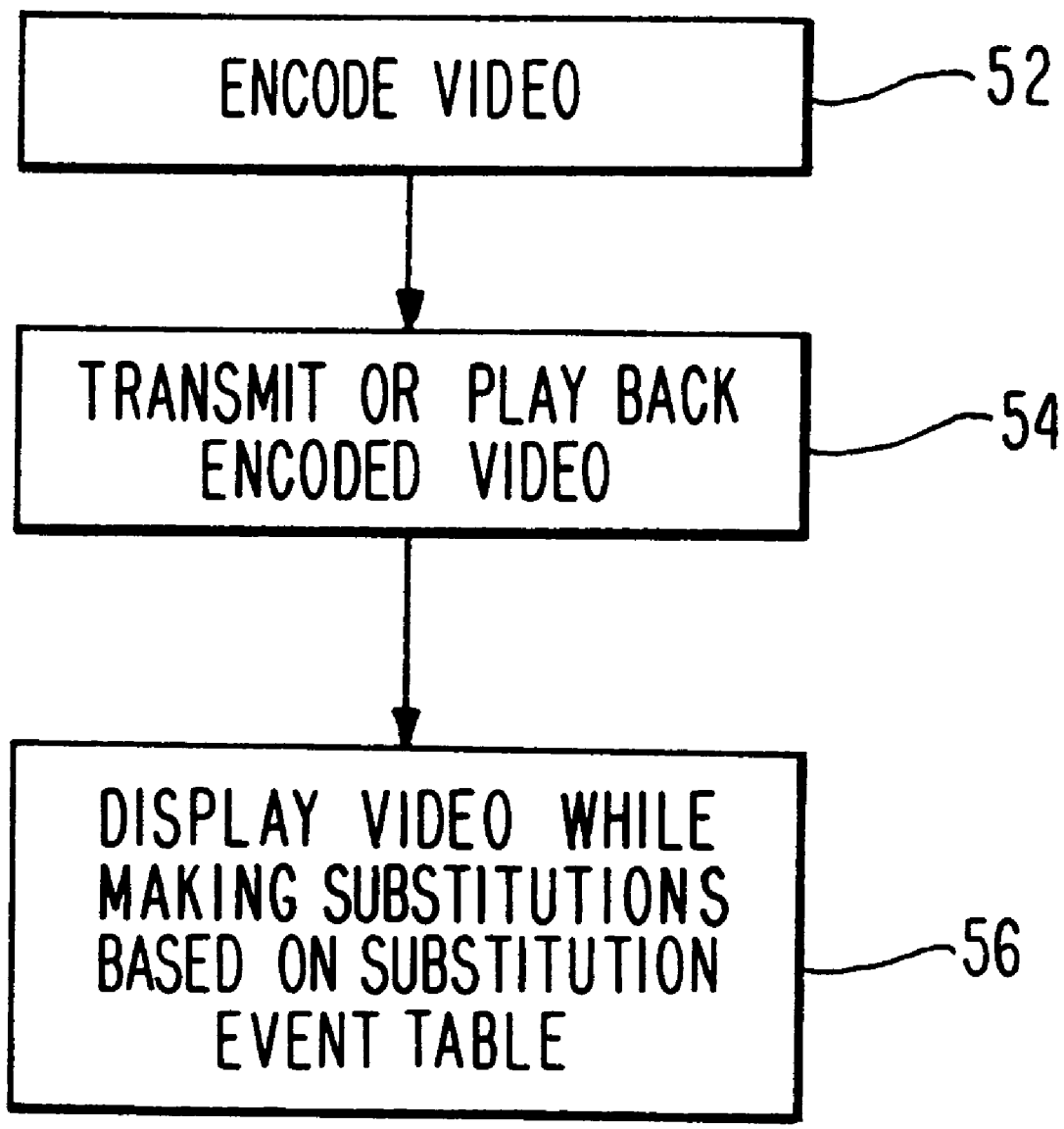
FIG. 5 is a flow chart showing steps involved in using the system of the present invention.

Steps involved in the operation of system 10 (FIG. 1) are shown in FIG. 5. At step 52, a video is encoded with substitution event codes using a suitable substitution event encoding scheme. Encoding is typically performed by a content provider during a suitable portion of the video production process. Encoding information can be provided as a separate data stream in parallel with the video information on the recording media on which the video is stored. The type of encoding technique that is used depends upon the type of recording media involved (e.g., video tape, videocassette, laser disk, digital video disk, digital file server, etc.) At step 54, the video is transmitted from remote video source 14 (FIG. 1) or is played back using local video source 16 (FIG. 1). At step 56, control circuitry 12 (FIG. 1) receives unfiltered videos and associated substitution event code information (e.g., substitution events codes and possibly substitution event durations) and displays a corresponding filtered video output on monitor 24 (FIG. 1). The filtering that is performed by control circuitry 12 (FIG. 1) at step 56 is based on a comparison between the substitution event codes provided with the video and the substitution event codes listed in the substitution event table. When a substitution event code from the transmitted or played back video matches a substitution event code in the substitution event table, control circuitry 12 (FIG. 1) performs a substitution based on default substitution information or based on substitution attribute information contained in the substitution event table.

Figure 6:
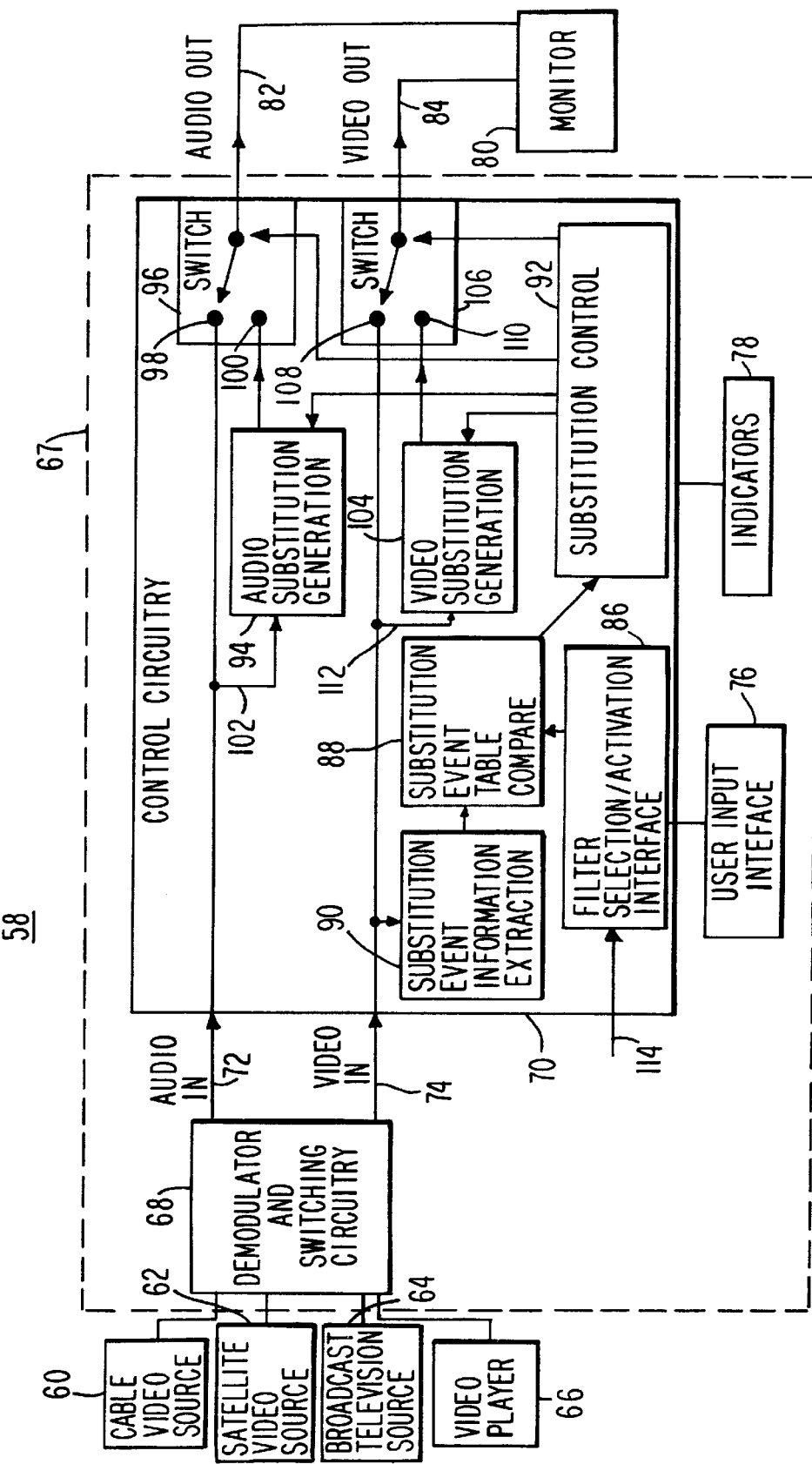
FIG. 6 is a schematic block diagram of an illustrative embodiment of the system of FIG. 1.

An illustrative embodiment of system 10 of FIG. 1 is shown in FIG. 6. In system 58, cable video source 60, satellite video source 62, and broadcast television source 64 are remote video sources. Video player 66, which may be a videocassette recorder, a laser disk player, a DVD player, or other suitable video media player, is a local video source. The content of the various video sources is filtered by user equipment 67.

Demodulator and switching circuitry 68 of user equipment 67 receives unfiltered videos from sources 60, 62 and 64, and from video player 66 that contain embedded substitution event information. Demodulator circuitry within demodulator and switching circuitry may be used to demodulate the output signals from sources 60, 62, and 64. Switching circuitry within demodulator and switching circuitry 68 is used to direct signals from video player 66 to signal paths 72 and 74. Demodulator and switching circuitry 68 passes audio signals from the videos to control circuitry 70 via signal path 72. Demodulator and switching circuitry 68 passes video signals and substitution event code information from the videos to control circuitry 70 via signal path 74. If desired, demodulator and switching circuitry 68 may be provided with suitable digital communications capabilities to handle digital information from sources such as sources 60, 62, 64, and 66.

A user controls the settings of control circuitry 70 by entering commands via user input interface 76. Indicators 78 may be used to indicate the state of the control circuitry 70 to the user. For example, indicators 78 may indicate what ratings setting a user has selected. Indications of the selected ratings setting may also be provided as part of the video display on monitor 80. Control circuitry 70 supplies filtered audio signals to monitor 80 via signal path 82 and supplies filtered video signals to monitor 80 via signal path 84.

Control circuitry 70 in FIG. 6 contains a number of functional blocks (e.g., substitution event information block, filter selection/activation interface block, etc.). The features of these functional blocks can be implemented in hardware, software, or a combination of hardware and software.

The user interacts with control circuitry 70 via user input interface 76. For example, the user may select a predetermined ratings setting, may create a new ratings setting, or may customize an existing ratings setting. Filter selection/activation interface block 86 receives inputs regarding the user's selection of ratings setting and provides a corresponding substitution event table to substitution event table compare block 88.

Video signals on signal path 74 from demodulator and switching circuitry 68 have associated substitution event information (e.g., substitution event codes and possibly substitution event duration data). Such substitution event information may be supplied, for example, in the vertical blanking interval of the video signal or in a side band. Substitution event information extraction block 90 extracts substitution event information from the video signal on signal path 74 and passes this information to substitution event table compare block 88.

In substitution event table compare block 88, incoming substitution event codes from the unfiltered video that have been extracted by substitution event information extraction block 90 are compared to the entries in the substitution event table selected by the user. If it is determined that a given substitution event code is not contained in the substitution event table, no action is taken and the corresponding substitution event is not filtered out of the video. If it is determined that a given substitution event code is contained in the substitution event table, then substitution event table compare block 88 passes data to substitution control block 92 that informs substitution control block 92 that the substitution event is to be filtered out of the video. If the substitution event table contains substitution attributes, the substitution attribute corresponding to the given substitution event code is provided to substitution control block 92.

In addition, substitution event table compare block 88 may pass substitution event information such as substitution duration information to substitution control block if such information was extracted from the video by substitution event information extraction block 90.

Substitution control block 92 controls the process of filtering out substitution events from the unfiltered video based on the control signals and substitution attributes received from substitution event table compare block 88. Because the components in control circuitry 70 may require some lead time before a given substitution can be made, a delay time of several video frames may be provided between the time at which a substitution event code is detected and the time at which control circuitry 70 begins to make the substitution. If delay times are used, substitution event information for each substitution event is embedded in the video slightly ahead (i.e., one delay time ahead) of the substitution event. Substitution control block 92 may use a fixed delay time or may use delay time information provided to control circuitry 70 as part of the substitution event information extracted by substitution event information extraction block 90.

If a substitution is to be made for an audio event, substitution control block 92 directs audio substitution generation block 94 to provide an appropriate audio output for the substitution and directs switch block 96 to switch from normal switch terminal 98 to substitution switch terminal 100. If a tone is desired, substitution control block 92 directs audio substitution generation block 94 to generate a tone. If silence is desired, substitution control block 92 directs audio substitution generation block 94 to generate a null signal. For more complex substitutions, such as a word substitutions, audio substitution generation block 94 may access a library of prestored audio samples. Audio substitution generation block 94 may also synthesize a word to be substituted using audio synthesizing circuitry. Some audio substitutions require that the incoming signal be modified. For example, it may be desired to disrupt, attenuate, or slightly garble the input audio. Audio signals to be modified are routed through audio substitution generation block 94 for modification via signal path 102.

If a substitution is to be made for the video portion of a substitution event, substitution control block 92 directs video substitution generation block 104 to provide an appropriate video output for the substitution and directs switch block 106 to switch from normal switch terminal 108 to substitution switch terminal 110. If a particular bit map image is desired, substitution control block 92 directs video substitution generation block 104 to generate that bit map. If a blank screen is desired, substitution control block 92 directs video substitution generation block 104 to generate a null video signal. For more complex substitutions such as a video image substitutions, video substitution generation block 104 may access a library of prestored video clips or video stills. Some video substitutions require that the incoming signal be modified. For example, it may be desired to overlay an image over the existing video image, disrupt the image by inverting the horizontal sync, diminish the video signal level, or garble the input video signal. Video signals to be modified are routed through video substitution generation block 104 for modification via signal path 112.

If it is desired to update the ratings settings, updated data can be provided to filter selection/activation interface 86 via input port 114.

If desired, the system of the present invention can handle digital video sources. Any suitable digital communications scheme may be used to transfer videos from a remote or local digital video source. A digital video stream is provided that may contain embedded substitution event information such as substitution event codes, substitution attributes, substitution duration data, and substitution delay information.

In addition, digital capabilities enhance the ability of system 58 to handle customized library files containing substitutions and synchronization information that allows events in a video to be associated with the substitutions. Such library files may contain, for example, digital audio samples of substitute words or phrases performed by the same actors that were in the original video. For example, if an actor uses profane language in a passage of a movie, the actor can record an alternate passage using language that is not profane. If the ratings setting selected by the user filters out this type of profane language, the system may automatically substitute the alternate passage in place of the profane passage. If the actor lip syncs adequately, such substitutions can be almost unnoticeable to the viewer. Library files of alternate video passages may also be provided.

The foregoing is merely illustrative of the principles of this invention and various modifications can be made by those skilled in the art without departing from the scope and spirit of the invention.

What is claimed is:

1. A method for reducing the level of objectionable content in a video presented to a viewer wherein the video includes video and audio content, comprising:

identifying objectionable words in the video using information that is embedded in the video in addition to the video and audio content of the video; and substituting corresponding alternate words for each of the objectionable words as the video is presented to the viewer.

2. The method defined in claim 1 further comprising receiving the video having objectionable words from a broadcast television source.

3. The method defined in claim 1 further comprising receiving the video having objectionable words from a satellite television source.

4. The method defined in claim 1 further comprising receiving the video having objectionable words from a cable television source.

5. The method defined in claim 1 comprising receiving the video having objectionable words from a video player.

6. The method defined in claim 1 comprising:

receiving the video with a set-top box;

using the set-top box to substitute the alternate words for the objectionable words; and presenting the video to the viewer on a television connected to the set-top box.

7. The method defined in claim 6 further comprising using the set-top box to receive the video from a broadcast television source.

8. The method defined in claim 6 further comprising using the set-top box to receive the video from a cable television source.

9. The method defined in claim 6 further comprising using the set-top box to receive the video from a satellite television source.

10. The method defined in claim 1 further comprising:

receiving the video with user equipment;

using the user equipment to substitute the alternate words for the objectionable words; and presenting the video to the viewer on a monitor connected to the user equipment.

11. The method defined in claim 1 wherein substituting comprises providing alternate words from a storage of words available for substitution.

12. The method defined in claim 1 comprising using at least some muting in substituting.

13. Apparatus for reducing the level of objectionable content in a video presented to a viewer wherein the video includes video and audio content, comprising control circuitry configured to:

identify objectionable words in the video using information that is embedded in the video in addition to the video and audio content of the video; and substitute corresponding less-objectionable words for each of the objectionable words as the video is presented to the viewer.

14. The apparatus defined in claim 13 wherein the control circuitry is configured to receive from a broadcast television source the video that has objectionable words.

15. The apparatus defined in claim 13 wherein the control circuitry is configured to receive from a satellite television source the video that has objectionable words.

16. The apparatus defined in claim 13 wherein the control circuitry is configured to receive from a cable television source the video that has objectionable words.

17. The apparatus defined in claim 13 wherein the control circuitry is configured to receive from a video player the video that has objectionable words.

18. The apparatus defined in claim 13 wherein the control circuitry is part of a set-top box that is configured to present the video to the viewer on a television connected to the set-top box.

19. The apparatus defined in claim 18 wherein the set-top box is configured to receive the video from a broadcast television source.

20. The apparatus defined in claim 18 wherein the set-top box is configured to receive the video from a cable television source.

21. The apparatus defined in claim 18 wherein the set-top box is configured to receive the video from a satellite television source.

22. The apparatus defined in claim 13 wherein the control circuitry is part of user equipment and wherein the user equipment is configured to receive the video, configured to substitute the alternate words for the less-objectionable words for the objectionable words, and configured to present the video to the viewer on a monitor connected to the user equipment.

23. The apparatus defined in claim 13 wherein the control circuitry is configured to provide alternate words from a memory in which words available for substitution are stored.

24. The apparatus defined in claim 13 wherein the control circuitry is further configured to use some muting in making substitutions.

* * * * *

UNITED STATES PATENT AND TRADEMARK OFFICE
CERTIFICATE OF CORRECTION

PATENT NO.    : 6,181,364 B1
DATED         : January 30, 2001
INVENTOR(S)   : K. Harlan Ford It is certified that error appears in the above-identified patent and that said Letters Patent is hereby corrected as shown below:

Title Page,
Item [56], References Cited, OTHER PUBLICATIONS, add -- ATI Technologies Inc., All-in-Wonder (product literature), pp. 1-6. --.
Item [57], ABSTRACT,
Line 11, change "may by replaced" to -- may be replaced --.

Drawings,
Figure 1, change "USER INPUT INTEFACE 76" to -- USER INPUT INTERFACE 76 --.
Sheet 6, FIG. 6, change "USER INPUT INTEFACE 76" to -- USER INPUT INTERFACE 76 --.

Column 1,
Line 64, change "objection" to -- objectionable --.

Column 5,
Line 11, change "to the those" to -- to those --.

Column 6,
Line 1, change "uses" to -- use --.
Line 16, change "hierarchial" to -- hierarchical --.
Line 49, change "substitution events" to -- substitution event --.

Column 8,
Line 5, change "substitution control block" to -- substitiution event --
Line 34, change "such as a work substitututions" to -- such as word substitutions --.

UNITED STATES PATENT AND TRADEMARK OFFICE
CERTIFICATE OF CORRECTION

PATENT NO. : 6,181,364 B1
DATED : January 30, 2001
INVENTOR(S) : K. Harlan Ford

It is certified that error appears in the above-identified patent and that said Letters Patent is hereby corrected as shown below:

Cont'd
Line 54, change "such as a video image substitutions" to -- such as video image Substitutions --.

Signed and Sealed this

Twenty-ninth Day of June, 2004

JON W. DUDAS
*Acting Director of the United States Patent and Trademark Office*